March 21, 1967 A. J. GARGANI 3,310,714
SILICON CONTROLLED RECTIFIER RELAY DRIVER WITH FEEDBACK
Filed Nov. 7, 1963 2 Sheets-Sheet 1

United States Patent Office 3,310,714
Patented Mar. 21, 1967

3,310,714
SILICON CONTROLLED RECTIFIER RELAY DRIVER WITH FEEDBACK

Arnold J. Gargani, Norristown, Pa., assignor to Leeds & Northrup Company, Philadelphia, Pa., a corporation of Pennsylvania Filed Nov. 7, 1963, Ser. No. 322,140
8 Claims. (Cl. 317—148.5)

This invention relates to amplifiers for driving relays and more particularly to a silicon controlled rectifier relay circuit for driving a relay.

It is common practice to energize a relay with an A.C. source and a control signal having a controllable phase with respect to the A.C. source. The control signal is applied to the control electrode of a silicon controlled rectifier, the anode and cathode of which are connected in series with the A.C. source and the relay winding. If the control signal goes through a positive half cycle at the same time that the A.C. source goes through a positive half cycle, the silicon controlled rectifier is triggered, or turned on, to energize the relay winding. When the control signal is in the opposite phase with respect to the A.C. source, the relay will not be energized. Further control of the energization of the relay is provided by varying the magnitude, or level, of the control signal when it is in the proper phase to fire the silicon controlled rectifier. Only when the magnitude of the control signal is above a certain threshold level will the silicon controlled rectifier be triggered. The silicon controlled rectifier is a very desirable driver for the above-mentioned relay circuit because its high gain provides the sensitive control action that is required.

However, a circuit of the foregoing type has a disadvantage. When the control signal is at the threshold level at which the relay is just energized during each half cycle, the relay tends to chatter, i.e., the contacts successively make and break at a high rate. When the control signal is just at the threshold level, spurious noise pulses which are usually present may cause spurious triggering of the silicon controlled rectifier. The resultant relay chatter is quite undesirable both from the standpoint of relay contact wear and from the requirements of the system in which the relay is employed.

In accordance with one aspect of the present invention, this disadvantage is overcome by developing and applying a nonlinear feedback voltage to the input to the relay driver.

In one embodiment of the invention the control signal, which is developed in a chopper-input amplifier, is applied through a first, input capacitor to the control electrode of a silicon controlled rectifier. The anode and cathode of the silicon controlled rectifier are connected in series circuit relationship with the relay coil and an A.C. supply source. Commonly, the final stage of the chopper-input amplifier is a transistor connected in a common emitter configuration and having the control voltage applied to the base thereof and the collector connected to the input capacitor.

When the control voltage undergoes a positive half cycle at the same time that the A.C. source undergoes a positive half cycle, the silicon controlled rectifier is turned on and remains on for the remainder of the positive half cycle of the A.C. source.

In accordance with the present invention, a non-linear feedback voltage is developed across an impedance element such as a resistor, or a Zener diode, connected in the cathode circuit of the silicon controlled rectifier. This feedback voltage is developed when the silicon controlled rectifier conducts, thereby causing current to flow through the resistor. The feedback voltage is applied to the input capacitor with a polarity such that a charge is developed on the input capacitor which tends to aid in turning on the silicon controlled rectifier during subsequent half cycles. Since the feedback voltage is developed only when the silicon controlled rectifier is being triggered, the level of the control signal required to maintain the relay energized during subsequent half cycles is less than the threshold level required to initiate the energizing of the relay. Because of this increase in the dead band of the driver, i.e., the difference between the level at which energization takes place and the level at which the relay is deenergized, relay chatter is eliminated.

There are at least two ways of applying the feedback voltage developed across the resistor to the input capacitor with the proper polarity. First, if a relatively large resistor is used in the cathode circuit of the silicon controlled rectifier, the voltage across it will be coupled directly through the cathode-control electrode junction of the silicon controlled rectifier to the capacitor with the proper polarity.

A second way in which the feedback voltage may be applied to the capacitor is employed in conjunction with a relatively small resistor connected in the cathode circuit of the silicon controlled rectifier. In this case, a relatively small feedback signal is coupled through a capacitor-resistor feedback network to the base of the final stage transistor of the chopper-input amplifier. In this manner, there is developed across the input capacitor a voltage having a polarity such that triggering of the silicon controlled rectifier is aided during subsequent half cycles.

The foregoing and further objects, features and advantages of the present invention, will be better understood from the following more detailed description in conjunction with the drawings in which.

Figure 1:
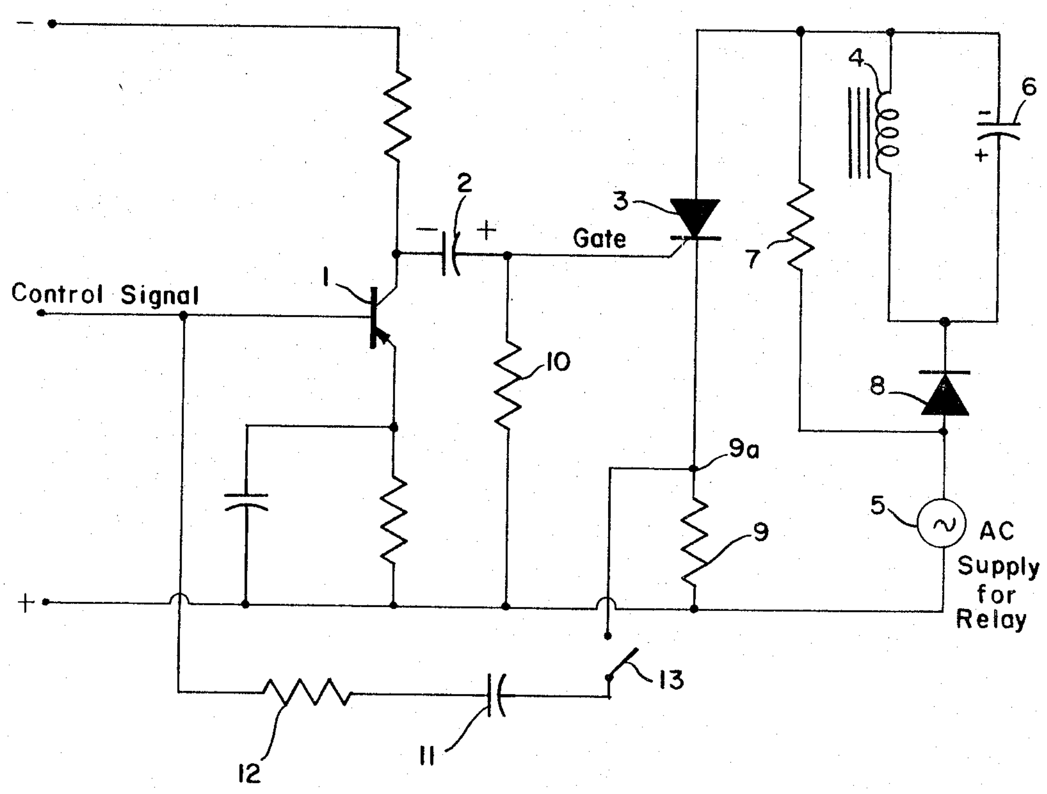
FIG. 1 shows a circuit diagram of the invention.

Referring now to FIG. 1, there is shown a transistor 1 which is the final stage of a chopper-input amplifier. This transistor develops a control signal at its collector which is coupled through input capacitor 2 to the control electrode of silicon controlled rectifier 3. The anode and cathode of silicon controlled rectifier 3 are connected in a series circuit with relay coil 4 and an A.C. supply source 5. The output of transistor 1 is either in phase or 180° out of phase with the A.C. source 5 supplying the relay.

It should be noted that the silicon controlled rectifier cannot conveniently be replaced with a conventional transistor since a sustained positive input to the control electrode would be required for a full half cycle to produce conduction for the half cycle. On the other hand, the silicon controlled rectifier requires only a positive trigger voltage which will render the silicon controlled rectifier conductive; the silicon controlled rectifier remains conductive during a full half cycle even after the positive triggering voltage has been removed.

As is conventional, a capacitor 6 is connected across relay coil 4 to maintain the relay energized over a full cycle when the silicon controlled rectifier is conducting each half cycle. During the half cycles of conduction, the silicon controlled rectifier 3 charges capacitor 6 to a voltage which maintains coil 4 energized. In order to prevent the build-up of charge on capacitor 6 from reducing conduction through the silicon controlled rectifier for less than the entire half cycle, a resistor 7 is connected across the relay coil 4. A diode 8 is provided to prevent discharge of capacitor 6 through resistor 7. (It should be noted that the resistor 7 is not essential for proper operation of the circuit if the resistor 9 is large.) The alternating current from source 5 is applied to the junction of resistor 7 and diode 8. Resistor 7 provides a current path that allows the silicon controlled rectifier 3 to conduct over practically the whole half cycle rather than the small portion of the half cycle when capacitor 6 conducts charging current.

In accordance with the invention, a resistor 9 is connected in the cathode circuit of the silicon controlled rectifier 3. A feedback voltage is developed at the junction 9*a*. The voltage at the junction 9*a* becomes more positive with respect to the other end of resistor 9 when the silicon controlled rectifier 3 conducts. This positive voltage is applied by way of the cathode-control electrode junction of silicon controlled rectifier 3 to the capacitor 2, thereby developing an additional D.C. voltage on capacitor 2 of the polarity indicated. (The control electrode may be referred to as the gate, as in FIG. 1.) A voltage of this polarity, a positive voltage applied to the control electrode, allows less signal to trigger silicon controlled rectifier 3 during subsequent half cycles. A control electrode bias resistor 10, the provision of which is conventional, is connected between the control electrode and a common reference.

When the resistor 9 is of a relatively small value, the feedback voltage at the point 9*a* may be applied through a capacitor 11 and resistor 12 to the base of transistor 1. A switch 13 has been shown as providing means for connecting this feed back loop to the junction 9*a*. In this case, the feedback signal-voltage acts at the base of transistor 1 to develop an additional negative polarity D.C. voltage at the collector of transistor 1 which results in additional charge on capacitor 2. Again, the voltage is of a polarity which allows a smaller signal to trigger the silicon controlled rectifier during subsequent half cycles.

The operation of the circuit is as follows. Initially, assume that the control voltage is below the threshold and of proper phase required for energization of the relay coil 4. Therefore, the silicon controlled rectifier 3 is not being triggered and no feedback voltage is developed at the junction 9*a*. When the control signal goes above the threshold level required for energization of the relay, the silicon controlled rectifier 3 is triggered during alternate half cycles of the A.C. source 5. When the silicon controlled rectifier 3 is triggered, a positive feedback voltage is developed at the point 9*a*. This voltage is applied either through the cathode-control electrode junction of silicon controlled rectifier 3 or through the feedback network including capactor 11, resistor 12 and the transistor 1 to the capacitor 2, or through both of the aforementioned paths. This develops a D.C. voltage on capacitor 2 of the polarity indicated. The D.C. voltage across capacitor 2 is algebraically added to the output of transistor 1 on the collector thereof. The polarity of the D.C. voltage is such that a lower level control signal from transistor 1 will trigger the silicon controlled rectifier 3. In this manner, the level of the control signal required to maintain the relay coil 4 energized is less than the threshold level required to initiate the energizing of the relay. Because of this, once the threshold level of the control signal is exceeded, the relay will remain energized as long as the control signal is in a range around the threshold level. Therefore, chatter of the relay which may be caused by spurious noise is eliminated.

Figure 2:
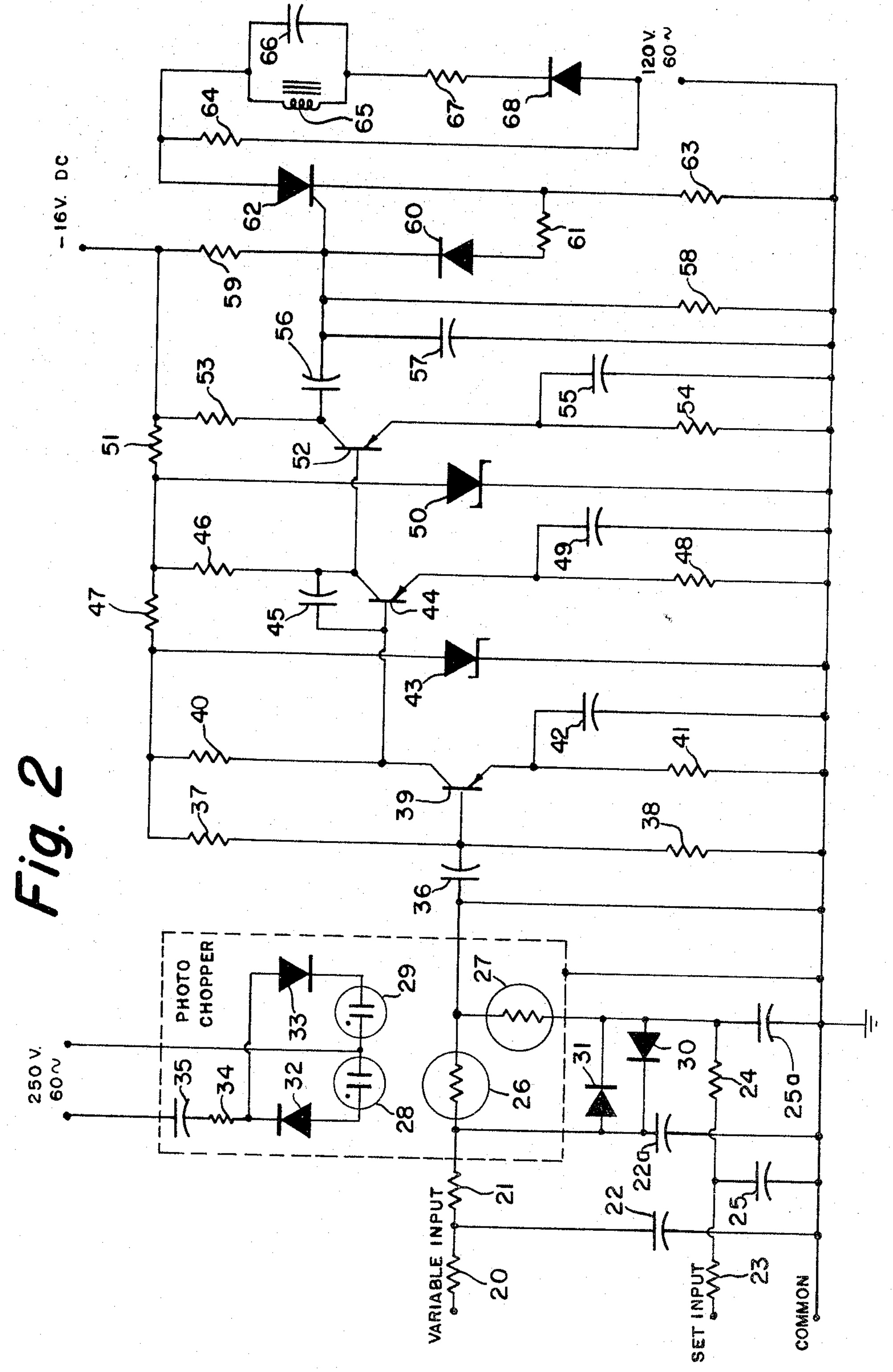
FIG. 2 shows in more detail a circuit diagram of the invention.

Referring now to FIG. 2, there is shown an actual embodiment of the invention shown in conjunction with a chopper amplifier which compares a variable input voltage with a set voltage to determine whether the variable input voltage is above or below the set voltage. Such a circuit is quite useful, particularly in load frequency control systems wherein a variable input voltage is compared with a set voltage to determine the energization of a relay which may control, for example, the flow of steam to a steam turbine. This circuit determines the limit at which the relay is energized. Such a circuit is commonly referred to as a limit circuit.

The following is a Table of Values for the components making up the chopper amplifier and relay driver shown in FIG. 2:

| | |
|---|---|
| Resistor 20 | 7.5K ohms. |
| Resistor 21 | 7.5K ohms. |
| Capacitors 22, 22*a* | Leeds and Northrup #023303. |
| Resistor 23 | 7.5K ohms. |
| Resistor 24 | 7.5K ohms. |
| Capacitors 25, 25*a* | Leeds and Northrup #023303. |
| Photoresistors 26, 27 | Clairex CL 603 AL. |
| Neons 28, 29 | Signalite LT–2–27–1R. |
| Diodes 30, 31 | 1N482A. |
| Diodes 32, 33 | Leeds and Northrup #188045. |
| Resistor 34 | 15K ohms. |
| Capacitor 35 | .03 microfarad. |
| Capacitor 36 | 4 microfarads. |
| Resistor 37 | 40.2K ohms. |
| Resistor 38 | 10K ohms. |
| Transistor 39 | Leeds and Northrup #188019. |
| Resistor 40 | 21.5K ohms. |
| Resistor 41 | 10K ohms. |
| Capacitor 42 | 100 microfarads. |
| Zener diode 43 | Leeds and Northrup #057056. |
| Transistor 44 | Leeds and Northrup #188010. |
| Capacitor 45 | .001 microfarad. |
| Resistor 46 | 17.8K ohms. |
| Resistor 47 | 1.78K ohms. |
| Resistor 48 | 15K ohms. |
| Capacitor 49 | 100 microfarads. |
| Zener diode 50 | Motorola 1/4M10Z10. |
| Resistor 51 | 1K ohm. |
| Transistor 52 | Leeds and Northrup #188010. |
| Resistor 53 | 10K ohms. |
| Resistor 54 | 15K ohms. |
| Capacitor 55 | 50 microfarads. |
| Capacitor 56 | 10 microfarads. |
| Capacitor 57 | .02 microfarad. |
| Resistor 58 | 47K ohms. |
| Resistor 59 | 470K ohms. |
| Diode 60 | 1N482A. |
| Resistor 61 | 6.8K ohms. |
| Silicon controlled rectifier 62 | Solid State Products #2N885. |
| Resistor 63 | 68 ohms. |
| Resistor 64 | 8.2K ohms. |
| Relay 65 | Adams and Westlake Relay #MWB2631. |
| Capacitor 66 | 250 microfarads. |
| Resistor 67 | 680 ohms. |
| Diode 68 | 1N482A. |

In FIG. 2, the variable input is applied through input resistors 20 and 21 to one input to a photo-diode chopper. As is conventional, the input is bypassed by capacitors 22 and 22*a*. Similarly, the set input is applied through resistors 23 and 24 to the other input to the photo-diode chopper. The set input is bypassed by capacitors 25 and 25*a*.

The photo chopper includes the photoresistors 26 and 27 and the neon lamps 28 and 29. The lamps 28 and 29 are alternately energized to alternately decrease the resistance of photoresistors 26 and 27. This has the effect of alternately applying the variable input and the set input to the common junction of these resistors to develop at this junction an A.C. signal having an amplitude proportional to the difference between the inputs. The photo chopper is fully described in the co-pending application of Albert J. Williams and Norman E. Polster entitled Photo Electric Modulator, bearing Ser. No. 281,616 and filed on May 20, 1963.

Diodes 30 and 31 are provided as limiters in order to prevent a large difference voltage between the variable input and the set input from being developed. If the difference between the variable input and the set input is quite large, the diodes 30 and 31 will conduct to limit this voltage to a desired value.

As is well known, the photo chopper compares the variable input with the set input to produce an A.C. voltage. The A.C. voltage having a magnitude indicative of the difference between the variable input and the set input is applied through capacitor 36 to the base of transistor 39 which provides one stage of amplification. The transistor 39 is directly coupled to a second stage of amplification provided by transistor 44. As is conventional with sensitive amplifiers, the supply voltages applied to the first and second stage transistors are decoupled by the Zener diodes 43 and 50.

The output of transistor 44, taken from the collector thereof, is applied to the final amplifying stage, transistor 52, which corresponds with the transistor 1 in FIG. 1. The signal on the collector of transistor 52 is coupled through capacitor 56 which corresponds with the capacitor 2 in FIG. 1. When the A.C. signal is above a predetermined threshold, the silicon controlled rectifier 62 will be triggered on alternate half cycles. After the initial half cycle which triggers silicon controlled rectifier 62, a feedback voltage is developed across the resistor 63. This feedback voltage is applied through the cathode-control electrode junction of silicon controlled rectifier 62 to the capacitor 56 and develops a voltage across capacitor 56 which allows a smaller signal to trigger the silicon controlled rectifier during subsequent half cycles.

The silicon controlled rectifier provides current to the relay coil 65 to pick up the relay when the threshold level is exceeded. The capacitor 66, the diode 68 and the resistor 64 perform functions already described in conjunction with capacitor 6, diode 8 and resistor 7 in FIG. 1.

Although all of the components in FIG. 2 have not been discussed in detail, it will be understood that their function is conventional and will be readily understood by those skilled in the art, particularly if the circuit diagram in FIG. 2 is considered in conjunction with the aforementioned table of typical values.

While particular embodiments of the invention have been shown and described, it will, of course, be understood that various changes may be made without departing from the principles of the invention. The appended claims are, therefore, intended to cover any such modifications within the true spirit and scope of the invention.

What is claimed is:

1. A relay driver comprising
- a semiconductive device having anode, cathode and control electrodes,
- said relay having a coil connected in series circuit relationship with said anode and said cathode and with an A.C. source of supply,
- a first capacitor having one terminal connected to said control electrode,
- means for applying to the other terminal of said capacitor a control signal having a variable amplitude level which triggers said semiconductive device when said level is above a predetermined threshold,
- an impedance element in series with said cathode for developing a feedback voltage when said semiconductive device is triggered, and
- means for applying said feedback voltage to said capacitor with a polarity which aids said control signal in triggering said semiconductive device so that the threshold level is decreased after said threeshold is initially exceeded.

2. The relay driver recited in claim 1 wherein said means for applying said feedback voltage to said first capacitor includes a second capacitor and a resistor connected in a series circuit between the junction of said cathode and said impedance element and said means for applying said control signal to said first capacitor.

3. In a synchronous relay driver amplifier comprising
- a unidirectional semiconductive means having an anode, a cathode, and a control electrode,
- a capacitor connected in series with said control electrode,
- an A.C. source of supply,
- a relay coil,
- means connecting said relay coil and said source of supply in series relationship with said anode and said cathode,
- means for applying an A.C. control signal in controlled phase relationship with said A.C. source of supply to the terminal of said capacitor remote from said control electrode, and
- means including an impedance element connected in series with said cathode to produce a charge on said capacitor during an initial application of said signal to said control electrode.

4. A synchronous amplifier comprising
- unidirectional semiconductive means having an output electrode, a common electrode and a control electrode,
- an input circuit including a capacitor connected to said control electrode,
- an output circuit including a utilization device and a source of A.C. supply connected in series relationship between said output electrode and said common electrode,
- means for developing an A.C. control signal having a component in controlled phase relation with said source of A.C. supply, said last-named means being in series between the terminal of said capacitor remote from said control electrode and said common electrode, and
- feedback means to produce a charge on said capacitor during half cycles of conduction of said unidirectional semiconductive means so that said capacitor attains a voltage having a polarity which aids said signal in turning on said semiconductive means at the beginning of each subsequent corresponding half cycle.

5. A relay driver amplifier comprising a unidirectional semiconductive device having anode, cathode and control electrodes,
- means connecting the coil of said relay in series circuit relationship with said anode and said cathode and with an A.C. source of supply,
- a first capacitor having one terminal connected to said control electrode,
- means including at least one transistor amplifying stage for applying to the other terminal of said capacitor an A.C. control signal having a controlled phase with respect to said A.C. source of supply and having a variable amplitude level which renders said unidirectional semiconductive device conductive when said level is above a predetermined threshold,
- a first resistor having one terminal connected to said cathode for developing across said first resistor a feedback voltage when said unidirectional semiconductive device is conductive, and
- means for applying said feedback voltage to said first capacitor with a polarity which aids said control signal in causing conduction in said semiconductive device so that the threshold level is decreased after said threshold is initially exceeded.

6. The relay driver amplifier recited in claim 5 wherein said means for applying said feedback voltage to said capacitor includes a second capacitor and a second resistor connected in a series circuit between the one terminal of said first resistor and the base of the transistor in said amplifying stage, the collector of said last-named transistor being connected to the terminal of said first capacitor remote from said control electrode.

7. The relay driver amplifier recited in claim 5 wherein said means for connecting said relay coil in series relationship with said anode and said cathode and said A.C. source of supply further includes a diode connected between said relay coil and said A.C. source of supply,
 a third capacitor connected across said relay coil, said third capacitor being charged by said unidirectional semiconductive device to a voltage which maintains said relay coil energized, said diode being poled in a direction which prevents discharge of said third capacitor, and
 a third resistor connected between the common junction of said relay coil and said third capacitor and the common junction of said diode and said A.C. source of supply, said third resistor providing an alternate path for current supplied by said unidirectional semiconductive device whereby said unidirectional semiconductive device conducts over full half cycles of said A.C. supply.

8. A limit circuit comprising
 means for producing an A.C. control signal of amplitude proportional to a controlled variable,
 a circuit component to be energized when said controlled variable attains a predetermined value,
 means for controlling the energization of said component comprising a silicon controlled rectifier having an anode, a cathode and a control electrode,
 a source of A.C. supply,
 a resistor, said source of A.C. supply and said resistor being connected in series circuit relation with said anode, said cathode, and said circuit component,
 a capacitor,
 means connecting said control electrode in series with said capacitor and said control signal for applying to said silicon controlled rectifier said control signal and for rendering said silicon controlled rectifier conductive when the said control signal attains said predetermined magnitude, and
 means including said resistor for developing a feedback voltage for said silicon controlled rectifier which is effective to reduce the magnitude of voltage required to maintain said rectifier conductive after being rendered conductive but which does not change the required magnitude of voltage to change its state from nonconductive to conductive whereby said circuit component is energized each time said control signal reaches said predetermined value and which is thereafter energized until the magnitude of said control signal is decreased substantially below the value which in the absence of said feedback would render said silicon controlled rectifier nonconductive.

References Cited by the Examiner

UNITED STATES PATENTS

| | | | |
|---|---|---|---|
| 3,103,618 | 9/1963 | Slater | 323—22 |
| 3,162,772 | 12/1964 | Smith | 317—148.5 X |

OTHER REFERENCES

General Electric Application Note, 20019, 3/1962, "Using Low Current Silicon Controlled Rectifiers and Silicon Controlled Switches," by D. R. Grafharn, pp. 12–13.

Solid State Products, Inc., Bulletin D420–02–8–1959, "A Survey of Some Applications of the Silicon Controlled Switch and Silicon Controlled Rectifiers," pages 15–17.

MILTON O. HIRSHFIELD, *Primary Examiner.*

J. A. SILVERMAN, *Assistant Examiner.*